US007209163B1

(12) United States Patent
Ono (10) Patent No.: US 7,209,163 B1
(45) Date of Patent: Apr. 24, 2007

(54) IMAGE PROCESSING APPARATUS, IMAGE OUTPUT APPARATUS, AND CAMERA (75) Inventor: Shuji Ono, Kaisei-Machi (JP)

(73) Assignee: Fujifilm Corporation, Kanagawa (JP)

( * ) Notice: Subject to any disclaimer, the term of this patent is extended or adjusted under 35 U.S.C. 154(b) by 640 days.

(21) Appl. No.: 09/585,553

(22) Filed: Jun. 2, 2000

(30) Foreign Application Priority Data

Jun. 3, 1999    (JP)    ................................ 11-157158

(51) Int. Cl.
H04N 5/225 (2006.01)
H04N 5/228 (2006.01)
H04N 5/262 (2006.01)
H04N 5/232 (2006.01)
H04N 5/235 (2006.01)
G06K 9/00 (2006.01)
G06K 9/46 (2006.01)

(52) U.S. Cl. ................. 348/207.99; 348/350; 348/362; 348/222.1; 348/239; 382/154; 382/195

(58) Field of Classification Search ................ 382/190, 382/192, 195, 201, 106, 154; 348/218.1, 348/345, 350, 349, 363
See application file for complete search history.

(56) References Cited

U.S. PATENT DOCUMENTS

| | | | | |
|---|---|---|---|---|
| 4,908,648 A | * | 3/1990 | Sawabe et al. | ............. 396/121 |
| 5,625,408 A | * | 4/1997 | Matsugu et al. | .............. 348/42 |
| 5,801,760 A | * | 9/1998 | Uomori | ........................ 348/47 |
| 6,160,909 A | * | 12/2000 | Melen | ........................ 382/154 |
| 6,377,305 B2 | * | 4/2002 | Onuki | ........................ 348/350 |
| 6,636,635 B2 | * | 10/2003 | Matsugu | ..................... 382/218 |
| 6,791,617 B1 | * | 9/2004 | Nakamura | ................... 348/345 |
| 6,823,080 B2 | * | 11/2004 | Iijima et al. | ................ 382/154 |

FOREIGN PATENT DOCUMENTS

| | | |
|---|---|---|
| JP | 63094232 | 4/1988 |
| JP | 3107933 | 5/1991 |
| JP | 3107934 | 5/1991 |
| JP | 4134330 | 5/1992 |
| JP | 5158132 | 6/1993 |
| JP | 5196857 | 8/1993 |
| JP | 5196858 | 8/1993 |
| JP | 5196989 | 8/1993 |
| JP | 7200824 | 8/1995 |
| JP | 7225841 | 8/1995 |
| JP | 7319037 | 12/1995 |
| JP | 9127405 | 5/1997 |
| JP | 9181866 | 7/1997 |
| JP | 9200508 | 7/1997 |
| JP | 8101338 | 4/1998 |
| JP | 11136568 | 5/1999 |

* cited by examiner

Primary Examiner—David Ometz
Assistant Examiner—Nhan T. Tran
(74) Attorney, Agent, or Firm—Birch, Stewart, Kolasch & Birch, LLP (57) ABSTRACT A camera includes a release button, an input unit, an A/D converter, a memory, a control unit, a recording unit and an output unit. The release button outputs a signal to instruct the input unit to photograph an image of a subject. The memory stores data of the image converted by the A/D converter. The control unit determines an input condition, a process condition, and an output condition for the image to give a refined image. The recording unit records the refined image on a recording medium. The output unit outputs the refined image.

8 Claims, 10 Drawing Sheets

IMAGE PROCESSING APPARATUS, IMAGE OUTPUT APPARATUS, AND CAMERA

This patent application claims priority based on a Japanese patent application, H11-157158 filed on Jun. 3, 1999, the contents of which are incorporated herein by reference.

BACKGROUND OF THE INVENTION

1. Field of the Invention

The present invention relates to an image processing apparatus, an image output apparatus and a camera, and more particularly to an image processing apparatus, an image output apparatus and a camera capable of determining conditions for processing, outputting and inputting an image based on depth information extracted from a parallactic image.

2. Description of the Related Art

Conventionally, a technique is known to extract image characteristics from a photographed image and process the image in accordance with the extracted image characteristics. This technique is disclosed in Japanese Patent Laid-open Publication (Kokai) H7-200824. However, information obtained from the image characteristics is not enough. Therefore, when a lot of people are in the image, it is difficult to separately recognize faces of people which are partially overlapping. It means that it is difficult to process each of the components in the image in accordance with different conditions, based on the image characteristics.

Japanese Patent Laid-open Publication (Kokai) H5-196857 discloses a technique to control exposure of an image based on a main object in the image. The main object is extracted from the image by setting a plurality of measuring points, and detecting variation of the data at the measuring points per predetermined period, using a conventional triangulation method. This technique uses infrared radiation for measuring the distance to each of the components in the image However, it was difficult to increase the measuring points because the directivity of the infrared radiation is limited. Therefore, the main object cannot be precisely extracted.

SUMMARY OF THE INVENTION

Therefore, it is an object of the present invention to provide an image processing apparatus, an image output apparatus and a camera, which overcome the above issues in the related art. This object is achieved by combinations described in the independent claims. The dependent claims define further advantageous and exemplary combinations of the present invention.

According to the first aspect of the present invention, an image processing apparatus for processing an image obtained by photographing a subject, comprises a condition-determining unit determining a condition for processing the image based on depth information indicating the distance to each part of the subject.

The image processing apparatus may include an image processing unit processing the image based on the condition for processing the image.

The image processing apparatus may include an extractor extracting the depth information based on a parallactic image obtained by photographing the subject from different viewpoints.

The extractor may extract data of an aimed object from the image based on the depth information, and the condition-determining unit may determine the condition for processing the image based on information including the data of the aimed object.

The extractor may extract image information included in the image and extract the aimed object based on the image information.

According to the second aspect of the present invention, an image output apparatus for outputting an image obtained by photographing a subject comprises a condition-determining unit determining a condition for outputting the image based on depth information indicating the distance to each part of the subject.

The image output apparatus may include an output unit outputting the image based on the condition for outputting the image.

The image output apparatus may include an extractor extracting the depth information based on a parallactic image obtained by photographing the subject from different viewpoints.

The extractor may extract data of an aimed object from the image based on the depth information, and the condition-determining unit may determine the condition for outputting the image based on information including the data of the aimed object.

The extractor may extract image information included in the image and extracts the aimed object based on the image information.

According to the third aspect of the present invention, an camera comprises: a first input unit inputting a parallactic image of a subject photographed from different viewpoints; a second input unit inputting a refined image of the subject; and a condition-determining unit determining a condition for inputting the refined image based on the parallactic image.

The camera may include an extractor extracting a depth information indicating the distance to each part of the subject based on the parallactic image, wherein the condition-determining unit may determine the condition for inputting the refined image based on the depth information.

The condition for inputting the refined image may include at least one of the conditions of focal length, aperture condition, exposure time, gradation characteristics, and sensitivity.

The extractor may extract data of an aimed object from the image based on the depth information, and the condition-determining unit may determine the condition for inputting the refined image based on information including the data of the aimed object.

The extractor may extract image information included in the refined image and extracts the aimed object based on the image information.

According to the fourth aspect of the present invention, a method of processing an image obtained by photographing a subject, comprises determining a condition for processing the image based on depth information indicating the distance to each part of the subject.

According to the fifth aspect of the present invention, a method of outputting an image obtained by photographing a subject, comprises determining a condition for outputting the image based on depth information indicating the distance to each part of the subject.

According to the sixth aspect of the present invention, a method of inputting a refined image of a subject, comprises: inputting a parallactic image of the subject photographed from different viewpoints; determining a condition for inputting the refined image based on the parallactic image; and inputting the refined image of the subject based on the condition for inputting the refined image.

The method may include inputting a raw image of the subject prior to the determination of the condition for inputting the refined image, wherein the determination of the condition for inputting the refined image may determine the condition based on the raw image of the subject.

According to the seventh aspect of the present invention, a recording medium storing therein a program executed by a computer to perform a method of processing an image obtained by photographing a subject, comprises determining a condition for processing the image based on depth information indicating the distance to each part of the subject.

According to the eighth aspect of the present invention, a recording medium storing therein a program executed by a computer to perform a method of outputting an image obtained by photographing a subject, comprises determining a condition for outputting the image based on depth information indicating the distance to each part of the subject.

This summary of the invention does not necessarily describe all necessary features so that the invention may also be a sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
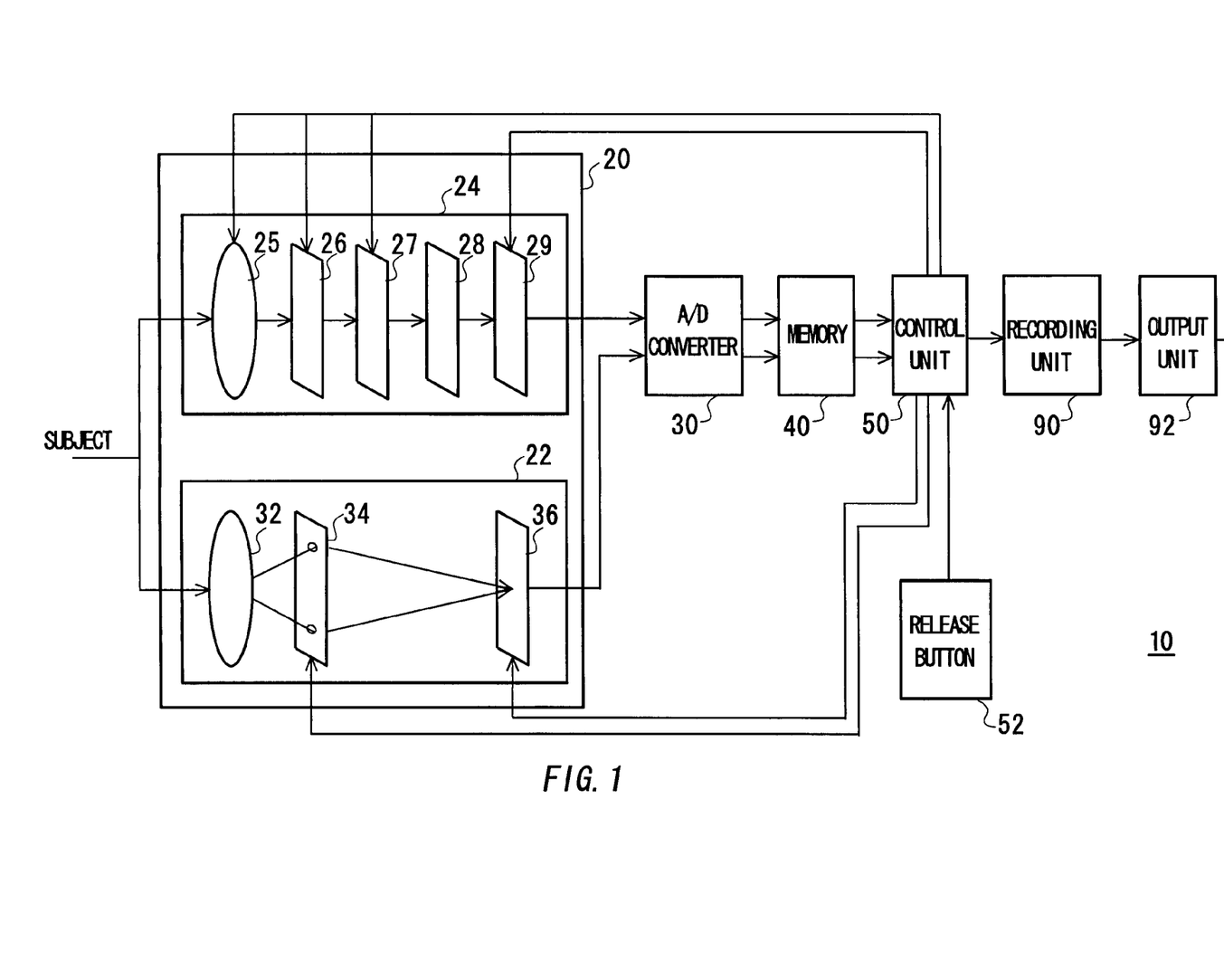
FIG. 1 shows a camera 10 of the first embodiment according to the present invention.

FIG. 1 shows an electronic camera 10 of the first embodiment according to the present invention. The camera 10 photographs a raw image of a subject and then photographs a refined image of the subject based on information from the raw image. The refined image is processed based on a process condition determined based on information from the raw image. The refined image is then output based on a condition determined based on information from the raw image.

The camera 10 includes an input unit 20, an A/D converter 30, a memory 40, a control unit 50, a release button 52, a recording unit 90 and an output unit 92. The camera 10 may be, for example, a digital still camera or a digital video camera.

The input unit 20 includes a parallactic image data input unit 22 and a normal image data input unit 24. The parallactic image data input unit 22 inputs a parallactic image, which is photographed from different viewpoints. The parallactic image data input unit 22 has a parallactic lens 32, a parallactic shutter 34, and a parallactic charge coupled device (CCD) 36. The parallactic lens 32 forms an image of a subject. The parallactic shutter 34 has a plurality of shutter units each of which serves as viewpoints. The parallactic shutter 34 opens one of the shutter units. The parallactic CCD 36 receives the image of the subject through the parallactic lens 32 and whichever of the shutter units of the parallactic shutter 34 that is opened. The parallactic CCD 36 also receives another image of the subject through the parallactic lens 32 and another of the shutter units of the parallactic shutter 34, which is opened at this time. The images received through the parallactic lens 32 and the parallactic shutter 34 form a parallactic image. Thus, the parallactic CCD 36 receives the parallactic image of the subject formed by the parallactic lens 32 and converts it to electronic signals.

The normal image data input unit 24 inputs a normal image photographed from a single viewpoint. The normal image includes a raw image which was previously photographed, and a refined image which is photographed based on an input condition determined in accordance with information from the raw image. The normal image data input unit 24 has a lens 25, a lens stop 26, a shutter 27, a color filter 28 and a charge coupled device (CCD) 29. The lens 25 forms an image of a subject. The lens stop 26 adjusts an aperture condition. The shutter 27 adjusts exposure time. The color filter 28 separates RGB components of the light received through the lens 25. The CCD 29 receives the image of the subject formed by the lens 25 and converts it to electric signals.

The A/D converter 30 receives analog signals from the parallactic image data input unit 22 and the normal image data input unit 24. The A/D converter 30 converts the received analog signals to digital signals and outputs the digital signals to the memory 40. The memory 40 stores the input digital signals. This means that the memory 40 stores the data for the parallactic image of the subject photographed by the parallactic image data input unit 22, and the data for the normal image of the subject photographed by the normal image data input unit 24.

The control unit 50 determines at least one of the conditions including an input condition for inputting a refined image, a process condition for processing the input image, and an output condition for outputting the processed image, based on information from the parallactic image and the raw image. The control unit 50 controls processing of the input image of the subject and outputs the processed image. The control unit 50 controls at least one of the following conditions: focus condition of the lens 25, aperture condition of the lens stop 26, exposure time of the shutter 27, output signal of the CCD 29, condition of the parallactic shutter 34, and output signal of the parallactic CCD 36.

The release button 52 outputs a signal to the control unit 50 for starting the photographing operation. This means that when a user of the camera 10 pushes the release button 52, the signal is output to the control unit 50. The control unit 50 then controls the input unit 20 to photograph the subject.

The recording unit 90 records the image and information related to the image output from the control unit 50 on a recording medium. The recording medium may be, for example, a magnetic recording medium such as a floppy disk, or a nonvolatile memory such as flash memory.

The output unit 92 outputs the image recorded on the recording medium. The output unit 92 may be, for example, a printer or a monitor. The output unit 92 may be a small liquid crystal display (LCD) of the camera 10. In this case, the user can see the image processed by the control unit 50 immediately after photographing the image. The output unit 92 may be an external monitor connected to the camera 10.

Figure 2:
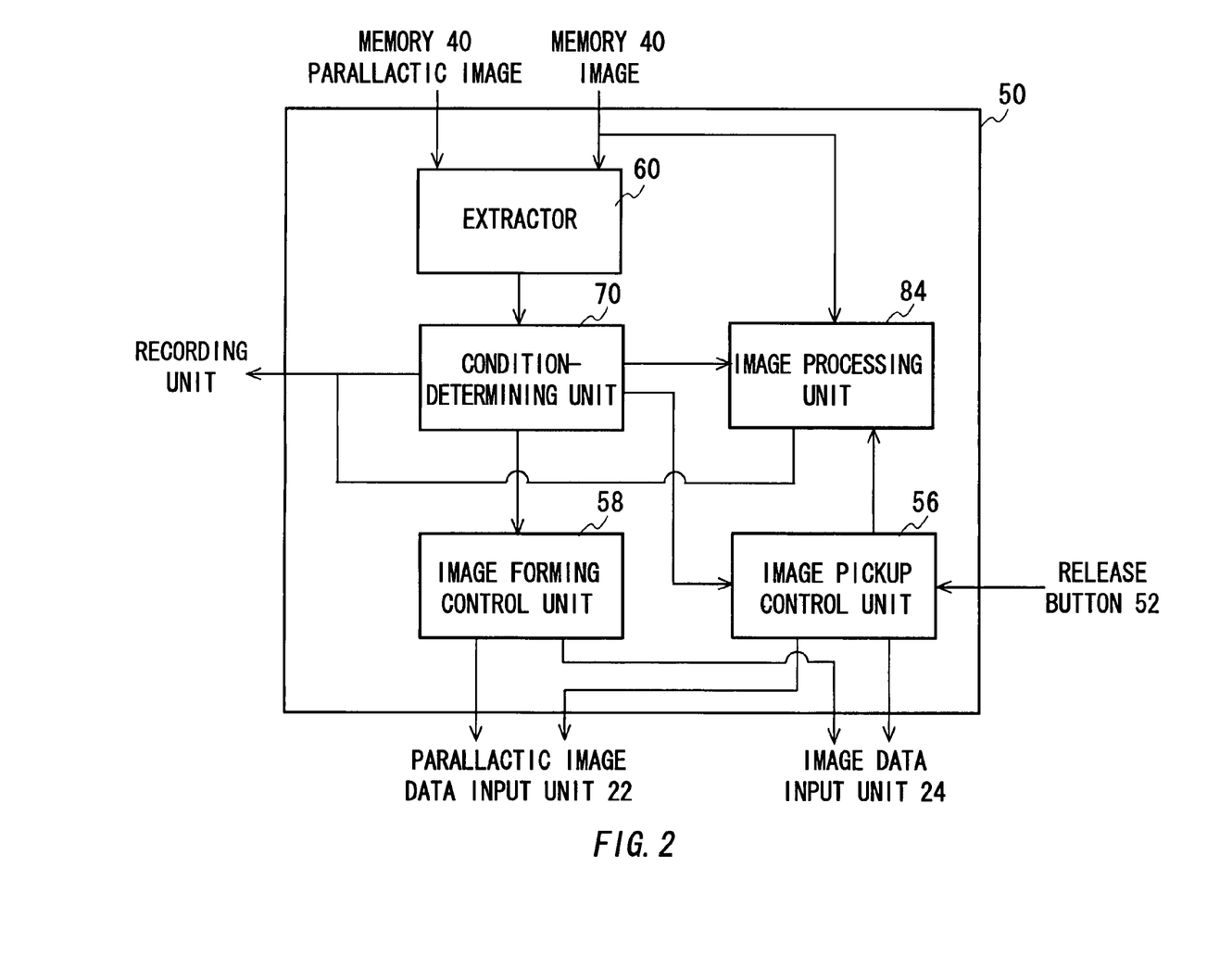
FIG. 2 is a block diagram of the control unit 50 according to the present embodiment.

FIG. 2 is a block diagram of the control unit 50 according to the first embodiment. The control unit 50 includes an image pickup control unit 56, an image forming control unit 58, an extractor 60, a condition-determining unit 70 and an image-processing unit 84.

The extractor 60 receives a parallactic image photographed by the parallactic image data input unit 22 and a normal image photographed by the image data input unit 24, from the memory 40. As described above, the normal image includes a raw image and a refined image. The extractor 60 extracts an aimed object from the normal image based on the information obtained from the parallactic image and the normal image. The information includes image information of the normal image and depth information of the parallactic image. The aimed object defined here is an independent object at which a photographer aims when photographing. The aimed object may be, for example, a person in a room when the person and the objects in the room are photographed, a fish in an aquarium when the fish and the aquarium are photographed, or a bird stopping on a branch of a tree when the bird and the tree are photographed. The aimed object may be an area extracted for a certain purpose. The extractor 60 then outputs the information related to the aimed object to the condition-determining unit 70.

The condition-determining unit 70 determines at least one of the following conditions including an input condition for inputting a refined image, a process condition for processing the input image, and an output condition for outputting the input/processed image, based on the information related to the image information for the aimed object or the depth information.

The image forming control unit 58 controls the input unit 20 to form a refined image of the subject based on the input condition determined by the condition-determining unit 70. This means that the image forming control unit 58 controls at least one of the conditions including focus condition of the lens 25, aperture condition of the lens stop 26, exposure time of the shutter 27, and condition of the parallactic shutter 34, based on the input condition.

The image pickup control unit 56 controls the input unit 20 to photograph a refined image of the subject based on the input condition determined by the condition-determining unit 70. This means that the image pickup control unit 56 controls at least one of the conditions including output signal of the CCD 29 and output signal of the parallactic CCD 36, based on the input condition. The output signal of the CCD 29 determines the gradation characteristics based on a gamma (γ) curve and sensitivity. The image pickup control unit 56 also controls the image-processing unit 84 to process the input normal image.

The image-processing unit 84 receives the normal image photographed by the image data input unit 24 from the memory 40. The image-processing unit 84 then processes the normal image based on the processing condition determined by the condition-determining unit 70.

Figure 3:
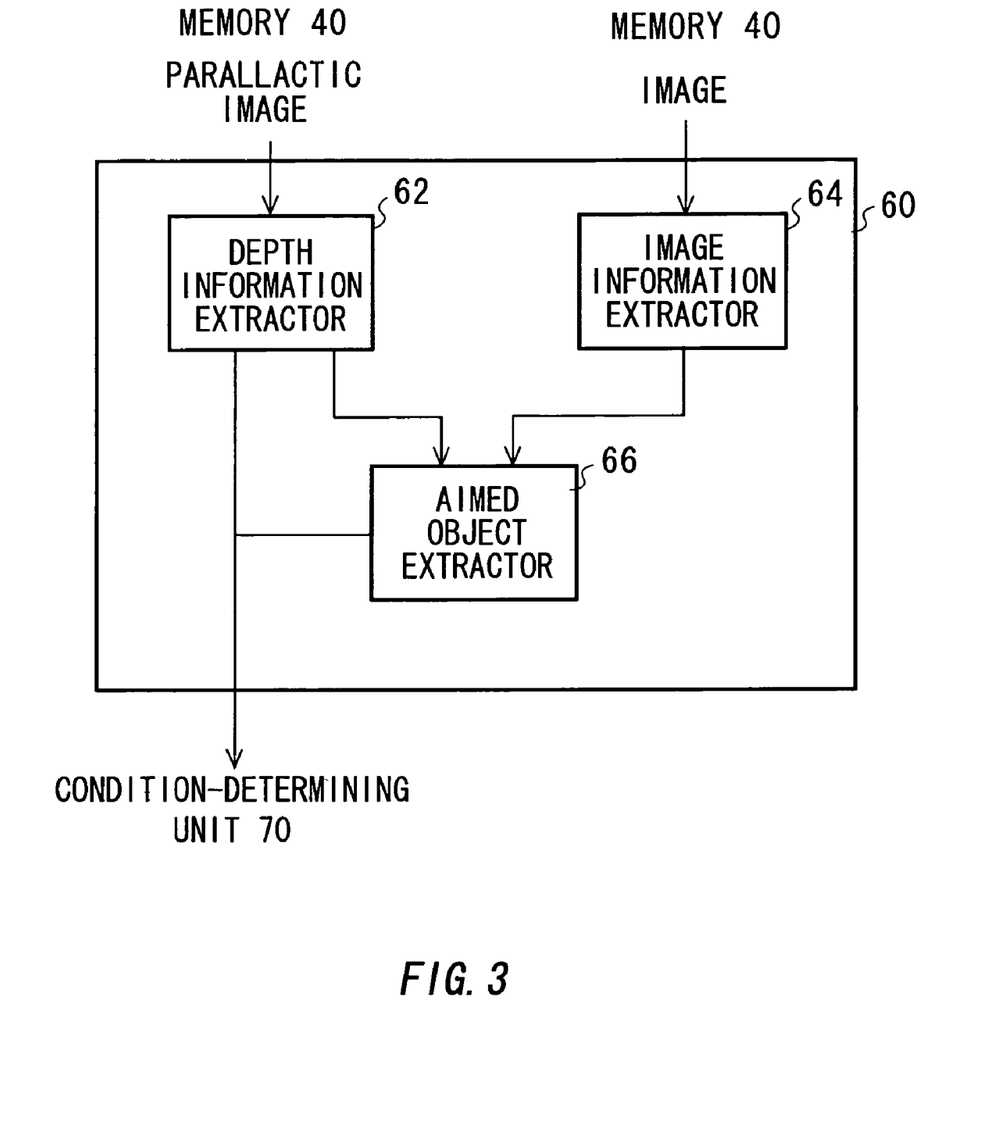
FIG. 3 is a functional block diagram of the extractor 60.

FIG. 3 is a functional block diagram of the extractor 60. The extractor 60 includes a depth information extractor 62, an image information extractor 64 and an aimed object extractor 66.

The depth information extractor 62 extracts the depth information indicating the distance to each of components of the subject, based on the data for the parallactic image received from the memory 40. This means that the depth information extractor 62 determines a corresponding point for each of the components based on the parallactic image and gives a parallax amount. The depth information extractor 62 extracts the depth information based on the parallax amount of each of the components. Determining the corresponding point is a known technique, thus the explanation of this technique will be omitted. Extracting the depth information based on the parallax amount is also a known technique using the principle of triangulation, thus the explanation of this technique will also be omitted.

The image information extractor extracts the image information for the normal image, from the data for the normal image received from the memory 40. The image information includes, for example, data from the normal image such as luminescence distribution, intensity distribution, color distribution, texture distribution, and motion distribution.

The aimed object extractor 66 extracts data for the aimed object based on the depth information and the image information. Each of the images may include, for example, a plurality of components. The aimed object extractor 66 recognizes each of the components based on the depth information. The aimed object extractor 66 then specifies the aimed object by referring to the depth information and the image information for each of the components. The method of specifying the aimed object will be described in the following.

Since cameras are usually used to photograph human beings, the aimed object should be related to the photographed person, especially to face of the person. Thus, the aimed object in this embodiment is targeted to be the face of the photographed person. Therefore, at first, a component including the face is specified depending on assumptions such as "the person should be close to the camera", "the person should be in the middle of the image", or "the proportional relationship of the height of the person to the width and height of the image should be within a predetermined range". The distance from the camera to each of the components in the image is evaluated based on the depth information. The distance from the center of the image to each of the components in the image, and the proportional relation ship of the height of the components are evaluated based on the image information. Each of the values is multiplied by predetermined constants corresponding to each condition. The multiplied values are added for each of the components. The added values are defined as weighted averages. The component having a largest weighted average is extracted as the component including the aimed object.

The constants by which the values for each of the components are multiplied may be predetermined based on the aimed object. In this embodiment, for example, the aimed object is assumed to be the face of the photographed person. Therefore, the aimed object extractor 66 specifies the area having a skin color as the face, based on the image information. The colors of each of the components are evaluated based on the color distribution of the images. The values of the color distribution may also be multiplied by predetermined constants and the multiplied values are added for each of the components to give the weighted averages. The aimed object extractor 66 then outputs the data of the aimed object to the condition-determining unit 70.

As described above, the aimed object extractor 66 extracts an aimed object based on the depth information in addition to the image information. Therefore, even when a plurality of people are photographed in the image and their faces are close to each other, the faces of the different people can be distinctively extracted. The aimed object extractor 66, extracting the aimed object based on the depth information obtained from the parallactic image, can extract the aimed object more precisely compared with an extractor using a multi-point distance measuring method.

Figure 4:
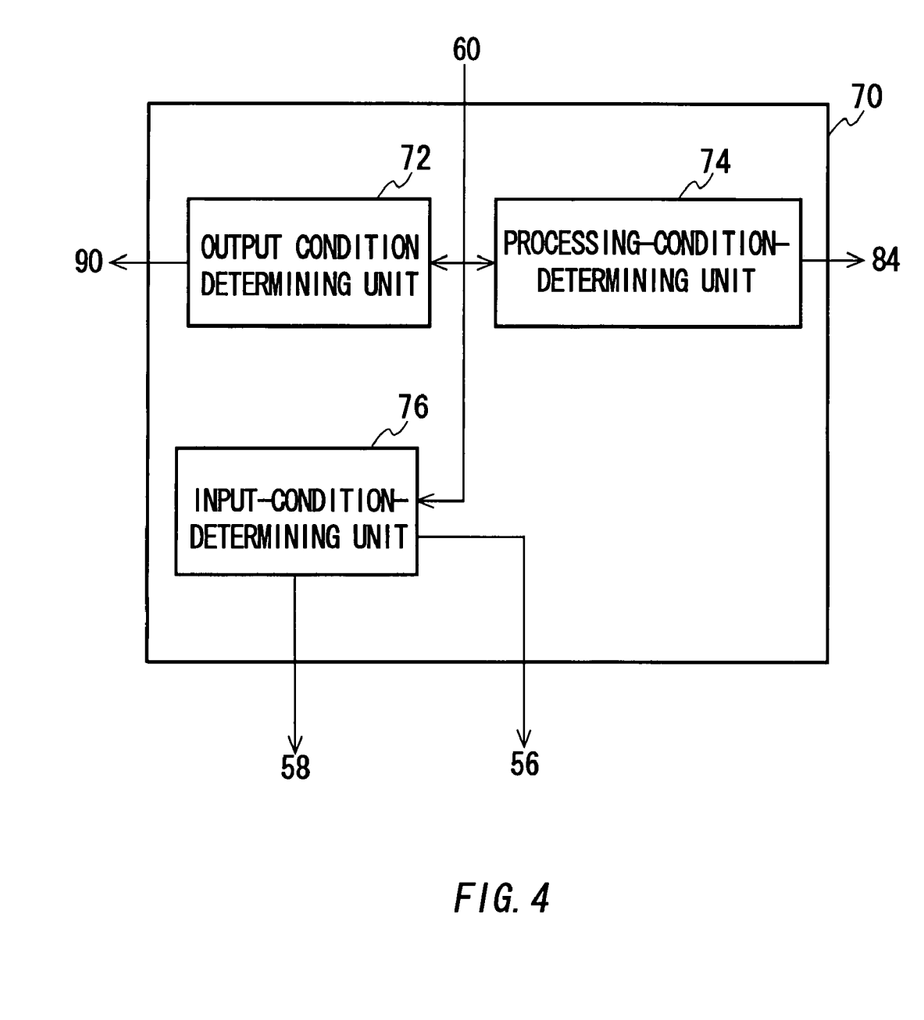
FIG. 4 is a functional block diagram of the condition-determining unit 70.

FIG. 4 is a functional block diagram of the condition-determining unit 70. The condition-determining unit 70 includes an input-condition-determining unit 76, a processing-condition-determining unit 74, and an output-condition-determining unit 72.

The input-condition-determining unit 76 determines an input condition for inputting a refined image, based on the depth information and the image information for the aimed object. The input condition for inputting a refined image may be determined by considering information related to the camera itself. The information related to the camera includes focus condition of the lens 25, aperture condition of the lens stop 26 and light exposure measured by the exposure meter, not shown in the drawings, when the camera 10 is photographing a raw image. Examples of the conditions for inputting a refined image will be explained in the following.

The input condition for inputting a refined image may relate to the aperture condition of the lens stop 26 and exposure time of the shutter 27. The input-condition-determining unit 76 evaluates the distance from the camera 10 to each component of the subject, based on the depth information. The input-condition-determining unit 76 then obtains the maximum distance between the components, which is the distance between the component nearest to the camera 10 and the component farthest from the camera 10. The input-condition-determining unit 76 determines the aperture condition of the lens stop 26 in accordance with the maximum distance between the components. The input-condition-determining unit 76 then determines exposure time of the shutter 27 based on the aperture condition of the lens stop 26. In the case of photographing a person relatively close to the camera with a background including a mountain far from the camera, for example, the aperture may reduce and the exposure time may be long.

The input condition for inputting a refined image may relate to the contrast or white balance of the image. The input condition in this case is determined based on the data for the aimed object. When photographing with a flashlight, the aimed object that is supposed to be close to the camera 10 may have a good color condition due to the light. However, the components other than the aimed object may be dark because these components cannot receive enough light. Therefore, the input-condition-determining unit 76 separately determines the contrast condition for the aimed object and for the components other than the aimed object.

The input condition for inputting a refined image may relate to the focus condition of the lens 25. The input condition in this case is determined based on the data for the aimed object. The input-condition-determining unit 76 determines the focus condition such that only the aimed object is focused.

The image forming control unit 58 controls focal length, aperture condition, and the exposure time of the input unit 20, based on the input condition determined by the input-condition-determining unit 76. The image pickup control unit 56 controls gradation characteristics and sensitivity of the input unit 20, based on the input condition determined by the input-condition-determining unit 76. The image data input unit 24 inputs a refined image based on the input condition determined by the input-condition-determining unit 76.

The recording unit 90 may record the refined image including data for the input condition, when recording the data for the refined image on the recording medium. The output unit 92 may output the refined image including the data for the input condition, when outputting the data for the refined image to an external monitor or an external printer.

The processing-condition-determining unit 74 determines a process condition for processing a normal image, based on the depth information and the image information for the aimed object. The normal image includes a refined image and a raw image. Examples of possible process conditions for processing a normal image are explained in the following.

The process condition for processing a normal image may relate to color of the image. The process condition in this case is determined based on the depth information. The processing-condition-determining unit 74 determines the condition by which the components close to the camera 10 are highly colored and the components far from the camera 10 are less colored. With this condition, the position of each of the components can be naturally expressed. The process condition in this case may be determined based on the data for the aimed object. The processing-condition-determining unit 74 may, for example, separately determine the color condition for the aimed object and for the components other than the aimed object so that all the components have optimum gradation.

The process condition for processing a normal image may relate to compression of the image. The process condition in this case is determined based on the data for the aimed object. The processing-condition-determining unit 74 separately determines the compression condition of the image for the aimed object and for the components other than the aimed object, so that the aimed object is not deteriorated, even though the data size of the image itself is compressed. The processing-condition-determining unit 74 may separately determine the color compression condition for the aimed object and components other than the aimed object.

The processing-condition-determining unit 74 may determine a process condition by which the aimed object in the image is magnified and the magnified aimed object is composited with a background image. The background image may be the components included in the original image other than the aimed object, or an image previously selected by the user of the camera 10.

The image processing unit 84 processes the normal image based on the process condition determined by the processing-condition-determining unit 74. The recording unit 90 may record the processed image along with data for the process condition when recording the data for the processed image on the recording medium. The output unit 92 may output the processed image along with the data for the process condition when outputting the data for the processed image to an external monitor or an external printer.

The output-condition-determining unit 72 determines an output condition for outputting a normal image, based on the depth information and the image information for the aimed object. The normal image includes a refined image, a raw image and a processed image thereof. Examples of the output condition for outputting a normal image will be explained in the following.

The output condition for outputting a normal image may relate to a condition for displaying the image. It takes a certain amount of time to display an image having a relatively large data size on a monitor. Therefore, the output-condition-determining unit 72 determines the output condition by which the aimed object is displayed antecedent to the rest of the components other than the aimed object.

The output condition for outputting a normal image may relate to a condition for transferring the image when the image is a motion picture. When the camera 10 photographs a motion picture and transfers the motion picture through a communication network to be displayed on a monitor connected to the network, the output-condition-determining unit 72 may determine the output condition for transferring data for the motion picture. For example, the data for the aimed object is transferred at a high transfer rate and the data for the rest of the components are transferred at a low transfer rate in accordance with the output condition. Furthermore, the output-condition-determining unit 72 may determine an output condition for the frequency modulation in which the acuteness of the aimed object is emphasized and the acuteness of the rest of the components is weakened.

The output condition for outputting a normal image may relate to a condition for printing the image. The output-condition-determining unit 72 may determine the output condition by which the image is developed, based on the condition of the aimed object. The output-condition-determining unit 72 may separately determine the output condition for the aimed object and for the components other than the aimed object, so that the aimed object does not deteriorate, even though the gradation of the image itself is varied in accordance with the dynamic range when the image is output to a printer or a monitor.

The recording unit 90 may record the normal image along with at least one of data for the input condition, data for the process condition, data for the output condition, and the depth information, on the recording medium.

As described above, the camera 10 of this embodiment is capable of determining the input condition for inputting a refined image, the process condition for processing an image, and the output condition for outputting an image, based on the depth information or the image information for the aimed object. Therefore, each of the conditions can be precisely determined.

Figure 5:
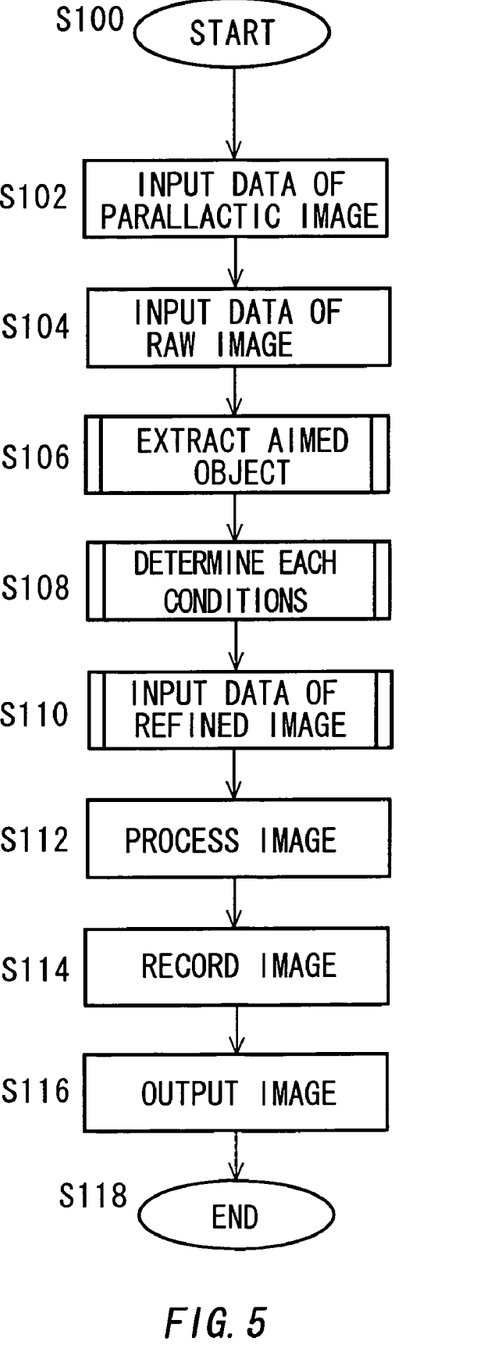
FIG. 5 is a flowchart showing the method of photographing a refined image.

FIG. 5 is a flowchart showing the method of outputting a refined image. When the user of the camera 10 pushes the release button 52, the camera 10 starts photographing (S100). At this time, the parallactic image data input unit 22 inputs a parallactic image (S102). At the same time, the image data input unit 24 inputs a raw image (S104). Then, the aimed object extractor 66 extracts an aimed object from the raw image (S106). The condition-determining unit 70 determines an input condition for inputting a refined image, a process condition for processing the input image, and an output condition for outputting the input image (S108). The input unit 20 then inputs a refined image in accordance with the input condition determined by the condition-determining unit 70 (S110).

The image processing unit 84 processes the input refined image based on the process condition determined by the condition-determining unit 70 (S112). The recording unit 90 records the refined image along with data for at least one of the input condition, the process condition and the output condition (S114). The output unit 92 outputs the image recorded by the recording unit 90 in accordance with the output condition determined by the condition-determining unit 70 (S116). The operation for outputting the refined image is terminated (S118).

Figure 6:
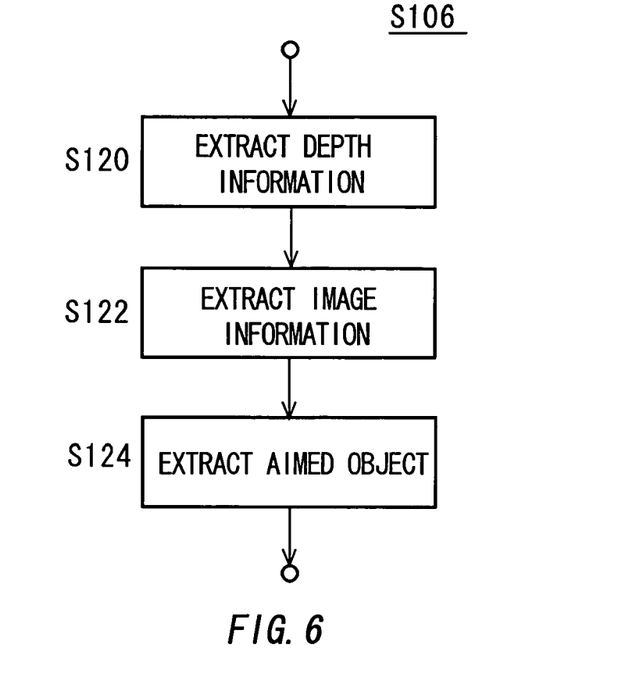
FIG. 6 is a flowchart showing in detail the method of extracting an aimed object, step 106 in FIG. 5.

FIG. 6 is a flowchart showing in detail the method of extracting an aimed object, step 106 in FIG. 5. The depth information extractor 62 extracts depth information based on the parallactic image (S120). The image information extractor 64 extracts image information based on the raw image (S122). The aimed object extractor 66 extracts an aimed object based on the depth information and the image information (S124).

Figure 7:
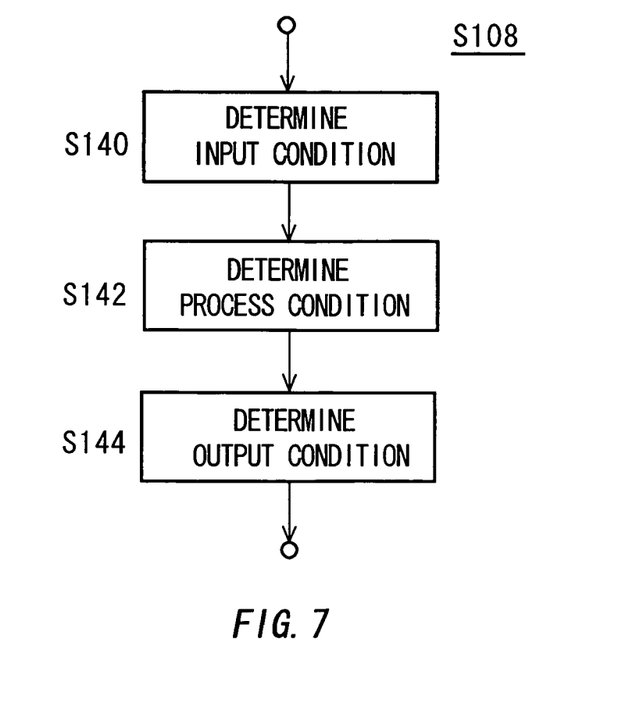
FIG. 7 is a flowchart showing in detail the method of determining each of the conditions, step 108 in FIG. 5.

FIG. 7 is a flowchart showing in detail the method of determining each of the conditions, step 108 in FIG. 5. The input-condition-determining unit 76 determines an input condition for inputting a refined image (S140). The processing-condition-determining unit 74 determines a process condition for processing an image (S142). The output-condition-determining unit 72 determines all output condition for outputting an image (S144).

Figure 8:
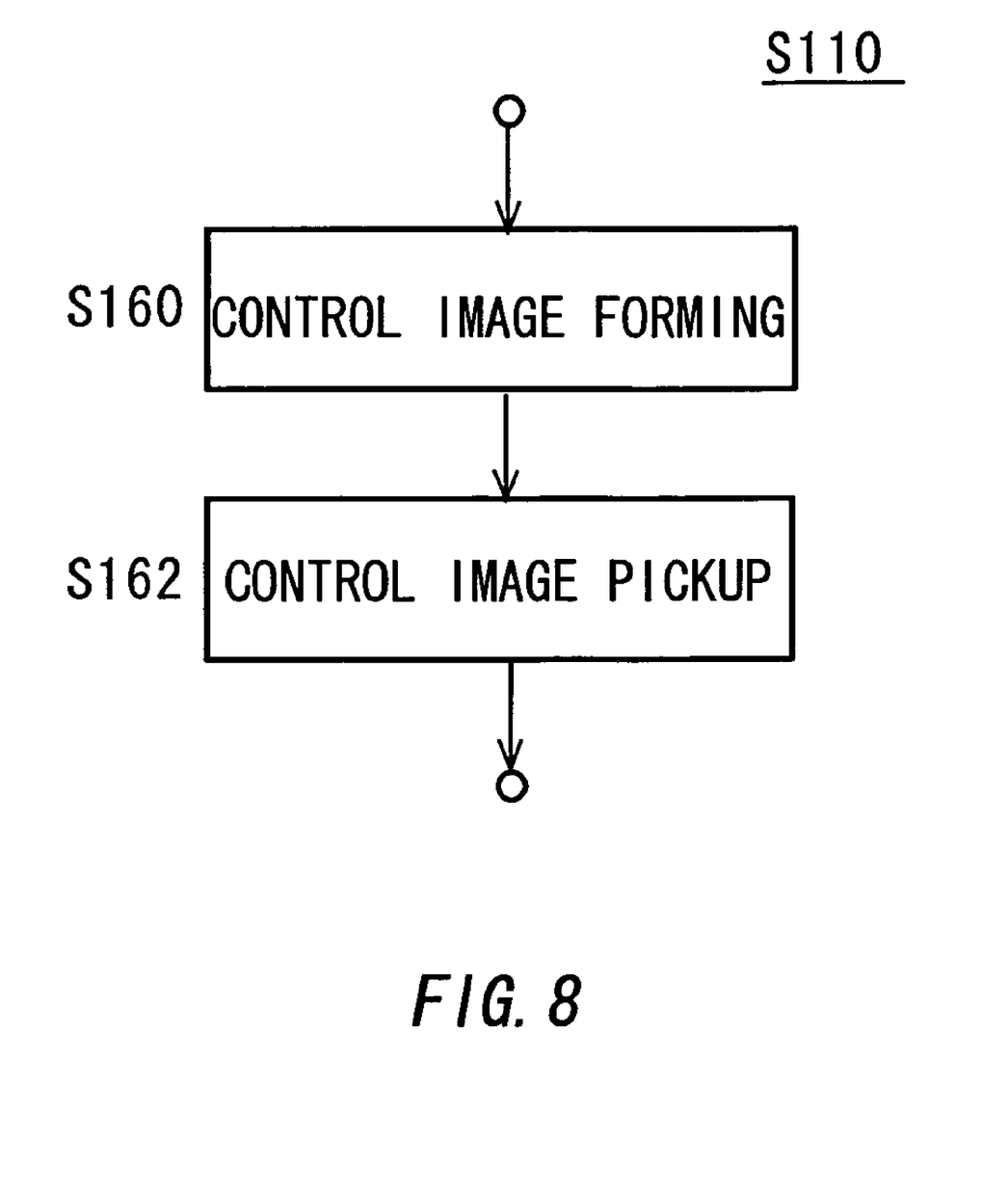
FIG. 8 is a flowchart showing in detail the method of photographing a refined image, step 110 in FIG. 5.

FIG. 8 is a flowchart showing in detail the method of photographing a refined image, step 110 in FIG. 5. The image forming control unit 58 controls at least one of the conditions including focal length, aperture condition, and exposure time of the input unit 20 based on the input condition determined by the condition-determining unit 70 (S160). The input unit 20 then forms an image of a subject. The image pickup control unit 56 controls at least either of the conditions including gradation characteristic and sensitivity of the input unit 20 (S162). The input unit 20 photographs the image of the subject as a refined image.

Figure 9:
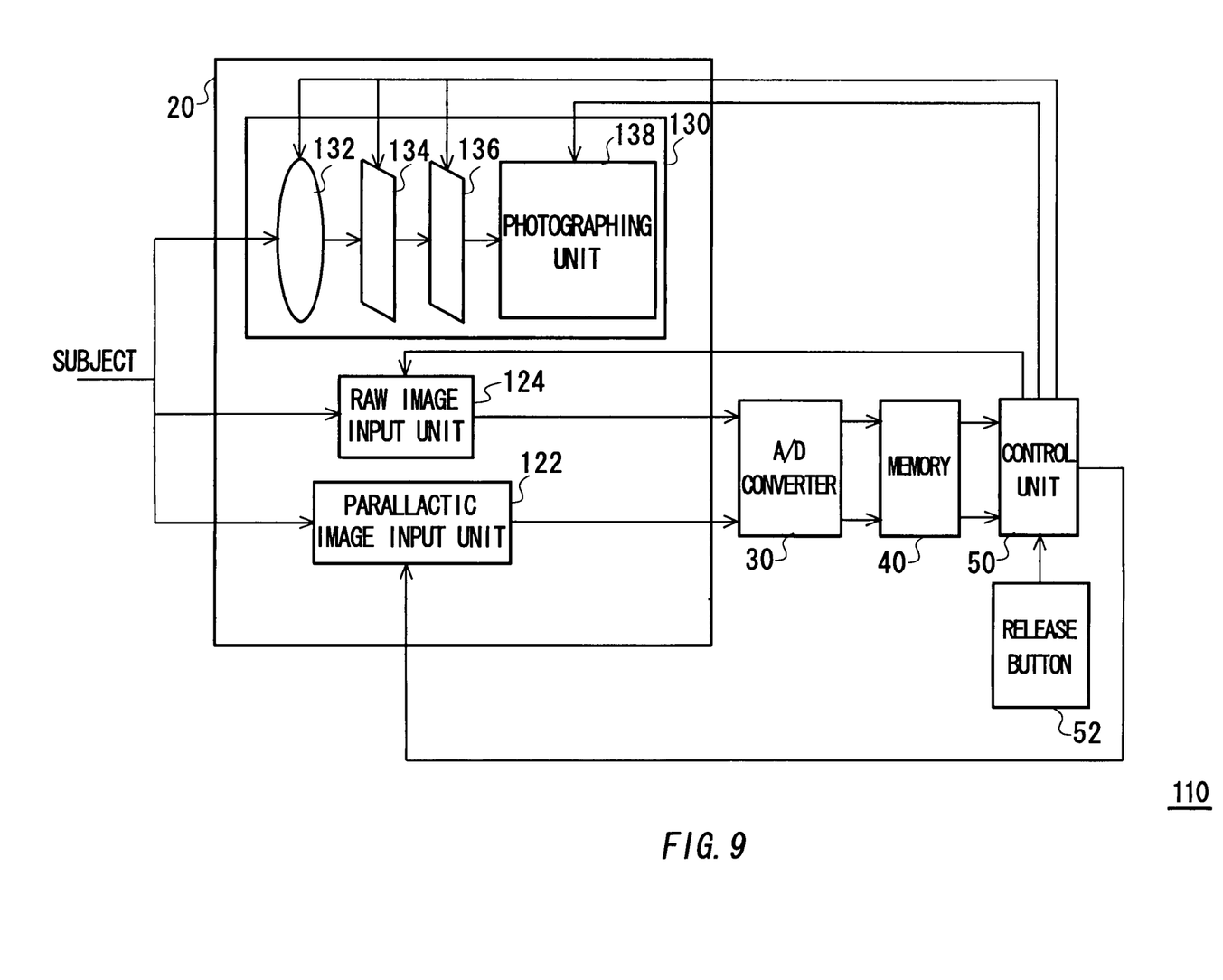
FIG. 9 shows a camera of the second embodiment according to the present invention.

FIG. 9 shows a camera 110 of the second embodiment according to the present invention. The camera 110 previously photographs a raw image of a subject and then determines an input condition for photographing a refined image, and an output condition for outputting the input image, based on the raw image. The camera 110 in this embodiment is a silver halide type camera by which an image of a subject is formed on a silver halide film. The camera 110 includes an input unit 120, an A/D converter 30, a memory 40, a control unit 150, and a release button 52. The A/D converter 30, the memory 40, and the release button 52 in this embodiment have same structures and functions as those explained in the first embodiment. Therefore, the explanation of these parts will be omitted.

The input unit 120 includes a parallactic image data input unit 122, a raw image data input unit 124 for inputting an electronic raw image and a refined image data input unit 130 for forming a refined image on a film. The parallactic image data input unit 122 and the raw image data input unit 124 in this embodiment respectively have the same structures and functions as the parallactic image data input unit 22 and the image data input unit 24 explained in the first embodiment. Therefore, the explanation of these parts will be omitted.

The refined image data input unit 130 includes a lens 132, a lens stop 134, a shutter 136 and a photographing unit 138. The lens 132, the lens stop 134 and the shutter 136 in this embodiment respectively have the same structures and functions as the lens 25, the lens stop 26 and the shutter 27 shown in FIG. 1 of the first embodiment. The photographing unit 138 receives an optical image of a subject and forms an image of the subject on silver halide film.

The image data input unit 24 of the first embodiment inputs both a raw image and a refined image. However, as for the camera 110 of this embodiment, the raw image data input unit 124 inputs an electronic raw image, and the refined image data input unit 130 inputs a refined image and forms the refined image on a film.

Figure 10:
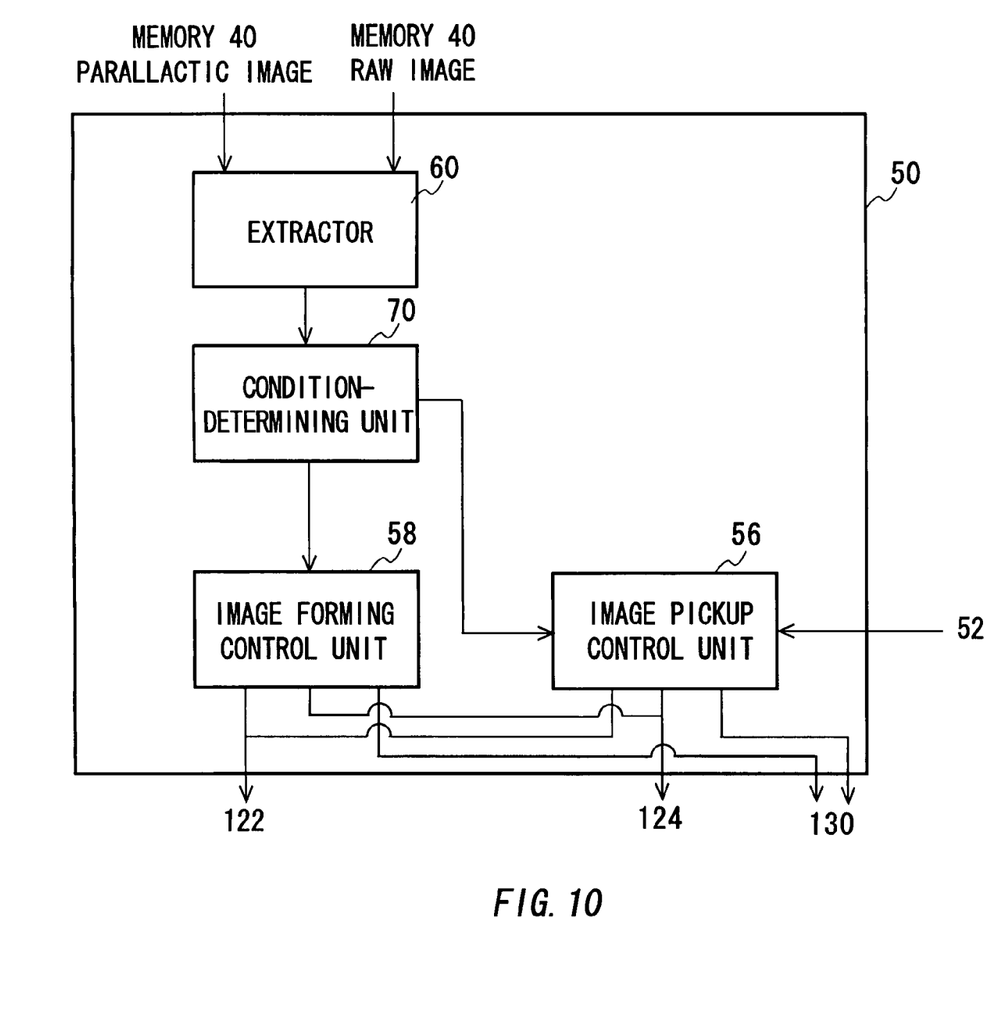
FIG. 10 is a block diagram of the control unit 50 according to the present embodiment.

FIG. 10 is a block diagram of the control unit 150 according to the second embodiment. The control unit 150 in this embodiment includes an extractor 60, a condition-determining unit 70, an image forming control unit 58, and an image pickup control unit 56. The extractor 60 in this embodiment has the same structure and function as the extractor 60 of the first embodiment, thus the explanation of this part will be omitted.

The condition-determining unit 70 determines at least one of the conditions including the input condition and the output condition, based on the depth information and the image information of the aimed object extracted by the extractor 60.

The image forming control unit 58 controls focal length, aperture condition, and the exposure time of the input unit 120 based on the input condition for inputting a refined image determined by the input-condition-determining unit 76. The image pickup control unit 56 controls gradation characteristics and sensitivity of the input unit 120, based on the input condition for inputting a refined image determined by the input-condition-determining unit 76. The refined image data input unit 130 forms an image of a subject on silver halide film along with information of the output condition or the depth information. A space is provided in the film, for the information related to the images.

In this embodiment, the camera 110 includes the raw image data input unit 124 for inputting an electronic raw image, in addition to the image data input unit 130 for inputting a refined image. Therefore, the camera can automatically set an optimum condition for photographing a refined image of the subject.

Figure 11:
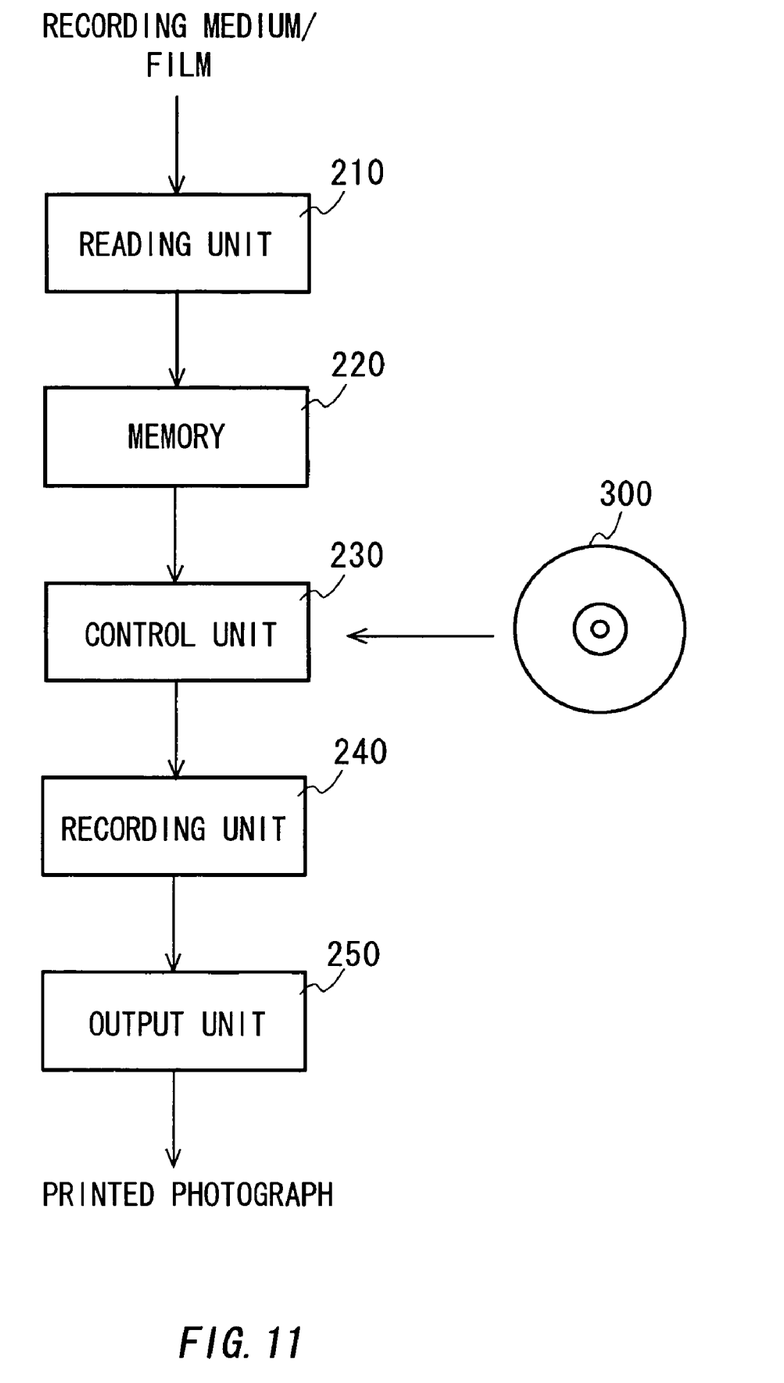
FIG. 11 shows a Laboratory system of the third embodiment according to the present invention.

FIG. 11 shows a laboratory system of the third embodiment according to the present invention. The laboratory system includes a reading unit 210, a memory 220, a control unit 230, a recording unit 240 and an output unit 250.

The reading unit 210 reads data of images and information related to the images from a recording medium for a digital camera, or a film. The recording medium for a digital camera may be a floppy disk or a removable flash memory. The reading unit 210 may be a floppy disk drive, for example, and reads the data of the images and the information from the recording medium for a digital camera. The reading unit 210 may have a communication unit through which data of an image photographed by a digital camera and information related to the image are transmitted over a computer network such as the Internet. Thus, the reading unit 210 can read the data of the images and the information thereof.

The reading unit 210 may be a film scanner, for example, and may read the data of the images and the information thereof from a film. A space is provided in the film, for the information related to the images. The reading unit 210 reads data of the images and the information related to each of the images.

The memory 220 stores the data of the images and the information thereof read by the reading unit 210. In this embodiment, the memory 220 stores depth information and image information as the information related to the images.

The control unit 230 has the same function as the control unit 50 of the camera 10 according to the first embodiment. The control unit 50 determines at least either of the conditions for processing or outputting the image, based on the depth information and the image information stored in the memory 220.

As for the films, the space for information related to the images is not large, therefore, only the image information related to the aimed object may be written. In this case, the condition for processing or outputting the image is determined based on the image information of the aimed object written on the film. As for the recording medium of the digital camera, parallactic images may be stored in the recording medium, and the depth information may be extracted based on the parallactic images.

The control unit 230 processes an image stored in the memory 220, based on the process condition. The processed image is recorded on the recording unit 240. The image recorded on the recording unit 240 is output from the output unit 250. The output unit 250 may be a color laser printer, or a digital printer.

The laboratory system in this embodiment may be a workstation, or a system using a computer such as a personal computer. The computer serves as the memory 220, the control unit 230 and the recording unit 240 shown in FIG. 11. Peripheral apparatus that together compose the system with the computer, may serve as the reading unit 210 and the output unit 250 shown in FIG. 11.

As for the control unit 230, the method of determining the process condition based on the depth information may be provided with a software program stored in a recording medium 300 shown in FIG. 11. Similarly, the method of determining the output condition based on the depth information may be provided with a software program stored in a recording medium 300 shown in FIG. 11.

As described above, the aimed object extractor 66 extracts an aimed object based on the depth information and the image information. Therefore, even when a plurality of people are photographed in the image and their faces are close to each other, the faces of the different people can be distinctively extracted.

Furthermore, the input condition, the process condition and the output condition are determined based on the depth information or the image information of the aimed object. Therefore, each of the conditions are precisely determined for the aimed object and the components in the image other than the aimed object.

Furthermore, as the aimed object extractor 66 extracts the aimed object based on the depth information obtained from the parallactic image, the aimed object can be extracted more precisely compared with the method using multi-point distance measurement.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image processing apparatus for processing an image obtained by photographing a subject, comprising:
    an image data unit for capturing a first image and a second image of the subject, said second image being captured in a parallactic manner, wherein the image data unit includes a parallactic image data input unit, wherein the parallactic image data input unit inputs a parallactic image which is photographed from different viewpoints;
    an extractor for extracting image information relating to conditions of the image only from said first image and depth information indicating a distance between a point to another point on the subject only from said second image; and
    a condition-determining unit for determining a process condition of said first image based on said depth information,
    wherein said extractor extracts data of an aimed object from said image based on said depth information, and said condition-determining unit determines said condition for processing said image based on information including said data of said aimed object.

2. An image processing apparatus as set forth in claim 1, further comprising an image processing unit processing said image based on said condition for processing said image.

3. An image processing apparatus as set forth in claim 1, wherein said extractor extracts image information included in said image and extracts said aimed object based on said image information.

4. The image processing apparatus of claim 1, wherein the determined process condition is at least one of a color condition, a compression condition, and a magnification condition.

5. A method of processing an image obtained by photographing a subject, comprising:
   capturing a first image and a second image of the subject, said second image being captured in a parallactic manner, wherein said second image is photographed from different viewpoints;
   extracting image information relating to conditions of the image only from said first image and depth information indicating a distance between a point to another point on the subject only from said second image; and
   determining a process condition of said first image based on said depth information,
   wherein extracting image information includes extracting data of an aimed object from said image based on said depth information, and
   wherein said determining a process condition includes determining said condition for processing said image based on information including said data of said aimed object.

6. The method of claim 5, wherein the determined process condition is at least one of a color condition, a compression condition, and a magnification condition.

7. A recording medium storing therein a program executed by a computer to perform a method of processing an image obtained by photographing a subject, comprising:
   capturing a first image and a second image of the subject, said second image being captured in a parallactic manner, wherein said second image is photographed from different viewpoints;
   extracting image information relating to conditions of the image only from said first image and depth information indicating a distance between a point to another point on the subject only from said second image; and
   determining a process condition of said first image based on said depth information,
   wherein extracting image information includes extracting data of an aimed object from said image based on said depth information, and
   wherein determining a process condition includes determining said condition for processing said image based on information including said data of said aimed object.

8. The recording medium of claim 7, wherein the determined process condition is at least one of a color condition, a compression condition, and a magnification condition.

* * * * *